US006541927B2

(12) United States Patent
Yamashita

(10) Patent No.: US 6,541,927 B2
(45) Date of Patent: Apr. 1, 2003

(54) COLOR CATHODE RAY TUBE AND ADJUSTING METHOD

(75) Inventor: Hiroshi Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/832,768

(22) Filed: Apr. 11, 2001

(65) Prior Publication Data

US 2002/0017870 A1 Feb. 14, 2002

(30) Foreign Application Priority Data

Apr. 12, 2000 (JP) ....................................... 2000-111045

(51) Int. Cl.[7] ............................ H01J 29/52; H04N 5/68

(52) U.S. Cl. ....................................... 315/381; 348/379

(58) Field of Search ................................ 315/367, 379, 315/381, 1; 345/211, 212; 348/379, 381

(56) References Cited

U.S. PATENT DOCUMENTS 5,949,400 A * 9/1999 Kim ........................... 345/147
6,034,665 A * 3/2000 Kim ........................... 345/593
6,069,619 A * 5/2000 Kim ........................... 345/211
6,069,660 A * 5/2000 Sato ........................... 348/379
6,211,629 B1 * 4/2001 Teuling et al. ................. 315/1
6,339,412 B1 * 1/2002 Lee ............................. 345/14

* cited by examiner

*Primary Examiner*—Don Wong
*Assistant Examiner*—Minh D A
(74) *Attorney, Agent, or Firm*—Frommer Lawrence & Haug LLP; William S. Frommer; Bruno Polito

(57) ABSTRACT

The format of a color video signal that has been inputted into a CPU from a video amplifying circuit is identified, and based on a given parameter variable according to this identified format, a second grid electrode voltage and the cathode bias voltages of cathodes for the three primary colors are determined, thereby driving a cathode ray tube with an optimal driving condition adequate for the video signal format. This parameter variable may be adjusted through a manual operation, allowing a user to set any desired driving condition for the cathode ray tube.

11 Claims, 5 Drawing Sheets

FIG. 3

| CPU BUILT-IN REGISTER NAME | VARYING D/A CONVERTER OUTPUT AND VARIABLE EXPRESSION | FINAL OUTPUT AND CORRESPONDING CRT ADJUSTMENT VOLTAGE |
|---|---|---|
| R_ECO_MAX<br>R_ECO_MIN | $21r = \frac{R\_ECO\_MAX - R\_ECO\_MIN}{255} \times ADJ\_VALUE + R\_BKG\_MIN$ | Ekco (R) |
| G_ECO_MAX<br>G_ECO_MIN | $21g = \frac{G\_ECO\_MAX - G\_ECO\_MIN}{255} \times ADJ\_VALUE + G\_BKG\_MIN$ | Ekco (G) |
| B_ECO_MAX<br>B_ECO_MIN | $21b = \frac{B\_ECO\_MAX - B\_ECO\_MIN}{255} \times ADJ\_VALUE + B\_BKG\_MIN$ | Ekco (B) |
| G2_MAX<br>G2_MIN | $22a = \frac{G2\_MAX - G2\_MIN}{255} \times ADJ\_VALUE + G2\_MIN$ | Vg |
| ADJ_VALUE | — | — |

| | ELECTRODE VOLTAGE/CUTOFF VOLTAGE/LUMINANCE |
|---|---|
| Vg | 667 · · · · · · 437 · · · · · · · · · · · 257 (V) |
| R DRIVING VOLTAGE | 36Vp-p |
| G DRIVING VOLTAGE | 36Vp-p |
| B DRIVING VOLTAGE | 37Vp-p |
| R CUTOFF VOLTAGE Ekco (R) | 94 · · · · · · 75 · · · · · · · · · · · 47 (V) |
| R CUTOFF VOLTAGE Ekco (G) | 100 · · · · · · 80 · · · · · · · · · · · 50 (V) |
| R CUTOFF VOLTAGE Ekco (B) | 98 · · · · · · 78 · · · · · · · · · · · 49 (V) |
| ALL-WHITE LUMINANCE | 123 · · · · · · 153 · · · · · · · · · · · 225 (nits) |
| SPOT SIZE | ϕ0.55 · · · · · · ϕ0.61 · · · · · · · · · · · ϕ0.78 |

COLOR CATHODE RAY TUBE AND ADJUSTING METHOD

BACKGROUND OF THE INVENTION

1. Field of The Invention

The present invention relates to a display apparatus and an adjusting method thereof, and more particularly, to a display apparatus including a color cathode ray tube comprising at least cathodes for the three primary colors and first and second grids wherein cutoff voltages of the respective cathodes for the three primary colors, and a voltage of the second grid may be desirably adjusted.

2. Description of The Related Art

In a color cathode ray tube used in a computer monitor for example, an adjusting mechanism is typically implemented for the optimization of fine image rendering, such as the rendering of line images etc., and not much emphasis is laid on the luminance since computers are generally used for data or word processing. Accordingly, the luminance level, although it depends on the size of a display, is kept at a low level, for example, a level around 100 to 150 nits. However, with the recent growth in the use of so-called multimedia applications on computer systems, there is an increasing demand for computer monitors to display dynamic picture images. However, it has been pointed out that picture images of such limited luminance would not promote powerfulness and sense of realism since the screen would be too dark.

Accordingly, in a case of a computer monitor utilizing a conventional cathode ray tube having predetermined cathode cutoff voltages and grid voltage, enhancement in the luminance would be attempted by increasing the level of, for example, input signals. However, this approach has a drawback, as it would significantly degrade the luminance life of the cathode ray tube. As a result, in a conventional apparatus, the adjustment is only made within a range below a given maximum luminance level, and any attempt to adjust the luminance to a level exceeding the predetermined level would typically result in collapsed peaks in a signal due to saturation occurred within a portion of its video signal circuitry, or in a case where the apparatus implements a protection mechanism for preventing the luminance level from exceeding a predetermined value, such an attempt would fail.

The present invention, invented in consideration with the above issues, attempts to solve those problems pointed out for the conventional computer monitor designed to provide a low level of luminance, that is, the screen too dark for providing powerful and realistic representation of dynamic picture images, and the luminance level limited to a certain value through implementation of a protection mechanism etc. for preventing an excessive increase in the luminance resulted from, for example, an increased input signal level, since such an increased input signal level would significantly degrade the luminance life of the cathode ray tube.

SUMMARY OF THE INVENTION

According to the present invention, a color cathode ray tube is provided, said color cathode ray tube comprising at least cathodes for the three primary colors and first and second grids, and being configured in a manner that cutoff voltages for the respective cathodes for the three primary colors and a voltage for the second grid are calculated using a common variable, and these voltages may be arbitrarily set, so that adequate luminance level control may be implemented by arbitrarily setting the cutoff voltages for the respective cathodes for the three primary colors and the voltage for the second grid, and at the same time, these voltages that are mutually associated may be configured in a simple manner.

BRIEF DESCRIPTION OF THE DRAWINGS

FIG. 3 is a table indicating relational expressions for calculating cutoff voltages using the variable [ADJ-VALUE].

DETAILED DESCRIPTION OF THE INVENTION

The present invention provides a color cathode ray tube having at least cathodes for the three primary colors and first and second grids, said color cathode ray tube comprising calculating means for calculating cutoff voltages of the respective cathodes for the three primary colors and a voltage for the second grid by using a common variable, controlling means to vary the variable, and setting means for setting the cutoff voltages of the respective cathodes for the three primary colors and the voltage of the second grid according to the calculated values.

The present invention further provides an adjusting method of a color cathode ray tube comprising at least cathodes for the three primary colors, and first and second grids wherein cutoff voltages of the cathodes for the three primary colors and a voltage of the second grid are calculated by using a common variable, and the cutoff voltages of the respective cathodes for the three primary colors and the voltage of the second grid are set according to the calculated values as the variable is varied.

Figures 4, 5:
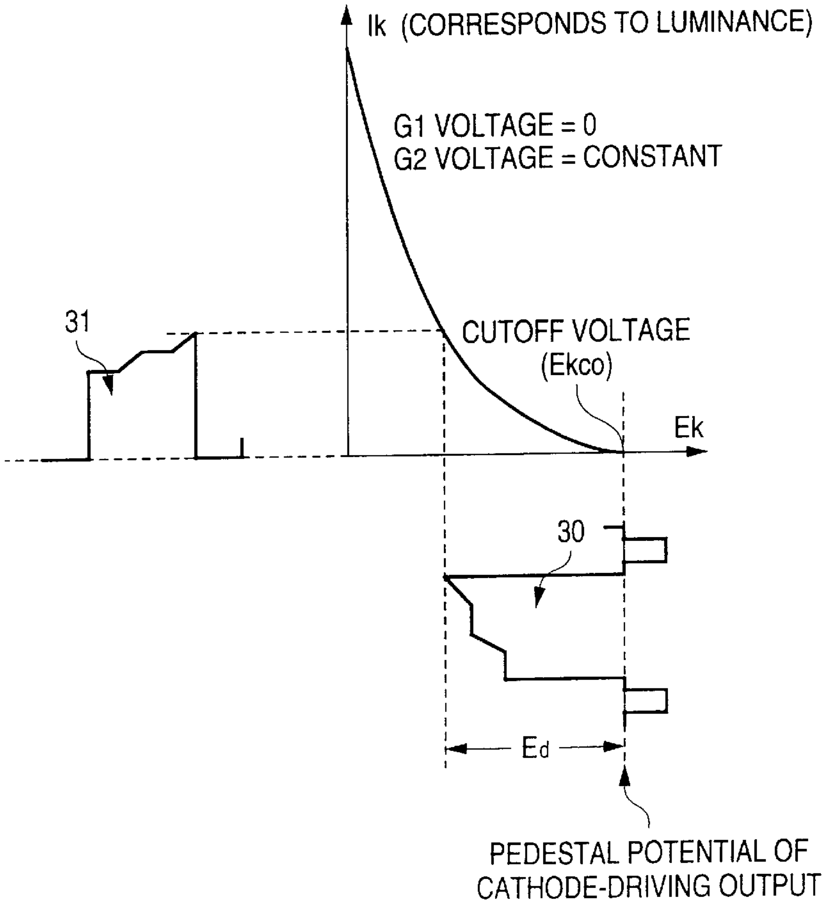
FIG. 4 is a table listing exemplary specific values.
FIG. 5 is a graphical representation illustrating an exemplary driving characteristic of a cathode ray tube.

FIG. 5 indicates a driving characteristic of an electron gun of, for example, one of the three primary colors, plotting a cathode voltage Ek represented by the horizontal axis against a cathode current Ik which corresponds to the luminance, represented by the vertical axis. In this example, the first grid is kept at a ground potential (0V), and the voltage of the second grid is fixed at a constant value. A waveform 30 in the diagram represents a driving voltage Ed applied to the cathode, and a waveform 31 represents a beam current. Here, when the cathode driving voltage (waveform 30) reaches to a pedestal potential, the cathode current Ik must fall to approximately 0, and the potential difference between the cathode and the first grid at this point is called a cutoff voltage Ekco.

That is, in the above cathode ray tube, an adjustment is performed on the cutoff voltage Ekco relative to the cathode voltage so that the cathode current Ik would fall to approximately 0 when the cathode driving voltage reaches to the pedestal potential. However, such a driving characteristic exhibits a different curve for each individual electron gun.

Accordingly, this cutoff adjustment must be performed separately for each electron gun, rendering this operation extremely complex. Such an adjustment may be performed on the side of the first grid, with a fixed cathode potential when the first grid is, for example, provided independently for each of the electron guns for the three primary colors (RGB), however, it would still be a complex operation.

The relationship between the driving voltage Ed and the cathode current Ik may generally be expressed by the following formula (1).

$$Ik=K.Ed^{\gamma} \qquad (1)$$

Here, the value K is a coefficient called a driving efficiency which becomes smaller inversely as the cutoff voltage Ekco becomes larger. The value γ is an exponent which has a tendency to slightly reduce as the second grid voltage Vg increases, and is generally around 2.5 in a typical cathode ray tube.

Figure 6:
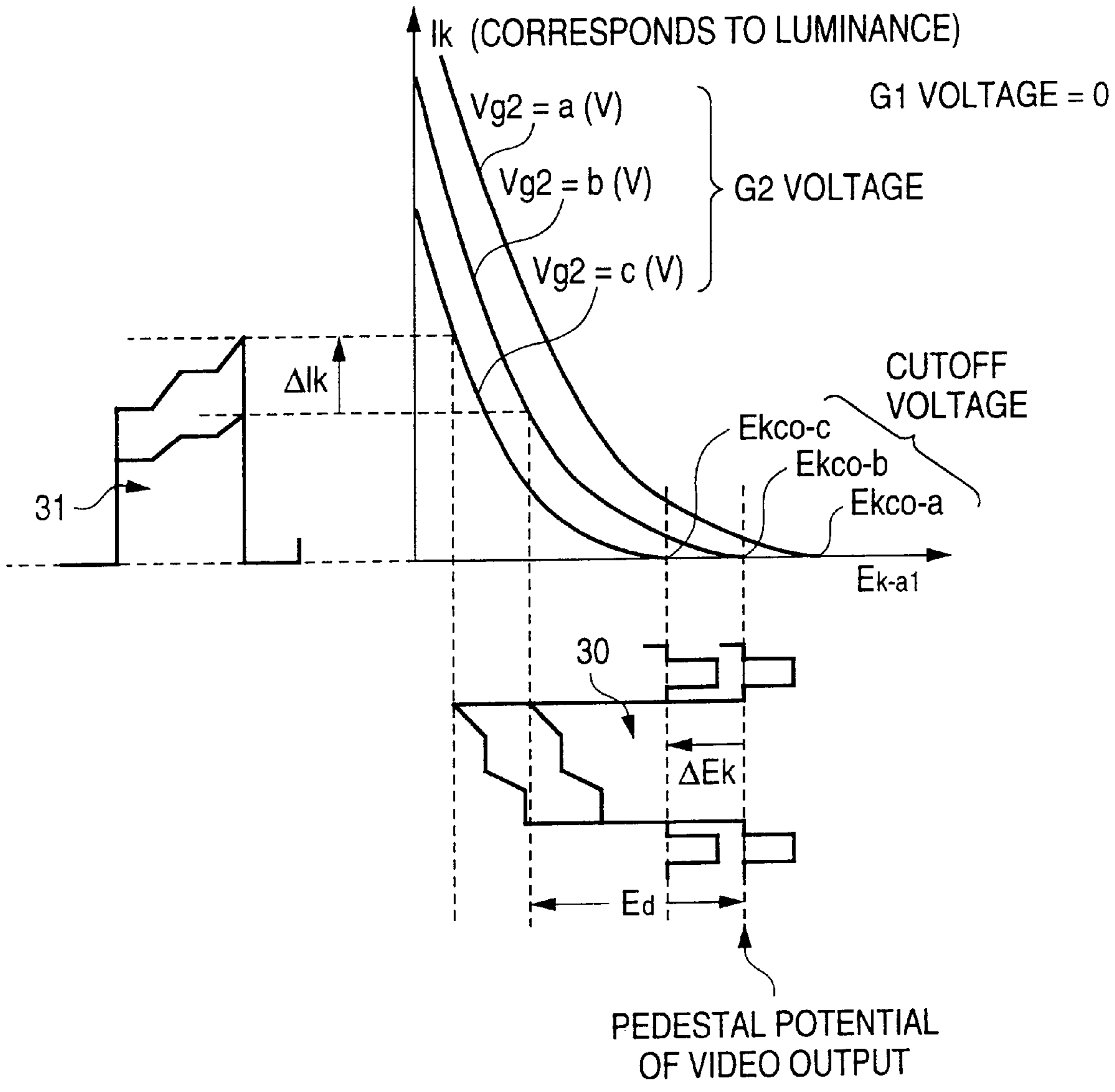
FIG. 6 is a graphical representation illustrating exemplary driving characteristics using the voltage of the second grid of a cathode ray tube as a parameter.

According to this formula, as the second grid voltage Vg increases, the cutoff voltage Ekco changes almost linearly. FIG. 6 shows variations of the above-mentioned curve obtained by varying the second grid voltage Vg. A curve is provided for each of respective cases, where Vg=a, b and c respectively, and the relationship between the values a, b, and c may be expressed as c<b<a. In FIG. 6, one cutoff voltage exists for each respective second grid voltage Vg, and a ΔEk change in this cutoff voltage Ekco would cause a ΔIk change in the cathode current Ik even though the driving voltage Ed is constant.

Accordingly, by varying the cutoff condition of the cathode ray tube while adequately controlling the second grid voltage Vg and the cutoff voltage Ekco, the cathode current Ik may be varied even with a constant driving voltage Ed, thereby allowing the luminance of a screen to be varied. However, in a conventional apparatus, the driving characteristic would yield a different curve for each individual electron gun as mentioned above, thus, such a cutoff adjustment has to be performed separately for each electron gun, rendering the adjustment extremely complex.

The present invention was invented in consideration of the above issues.

Embodiments

The present invention will now be explained in greater detail with reference to FIG. 1 which is a block diagram showing an exemplary configuration of a color cathode ray tube according to one embodiment of the present invention, implementing an adjusting method of the present invention.

Figure 1:
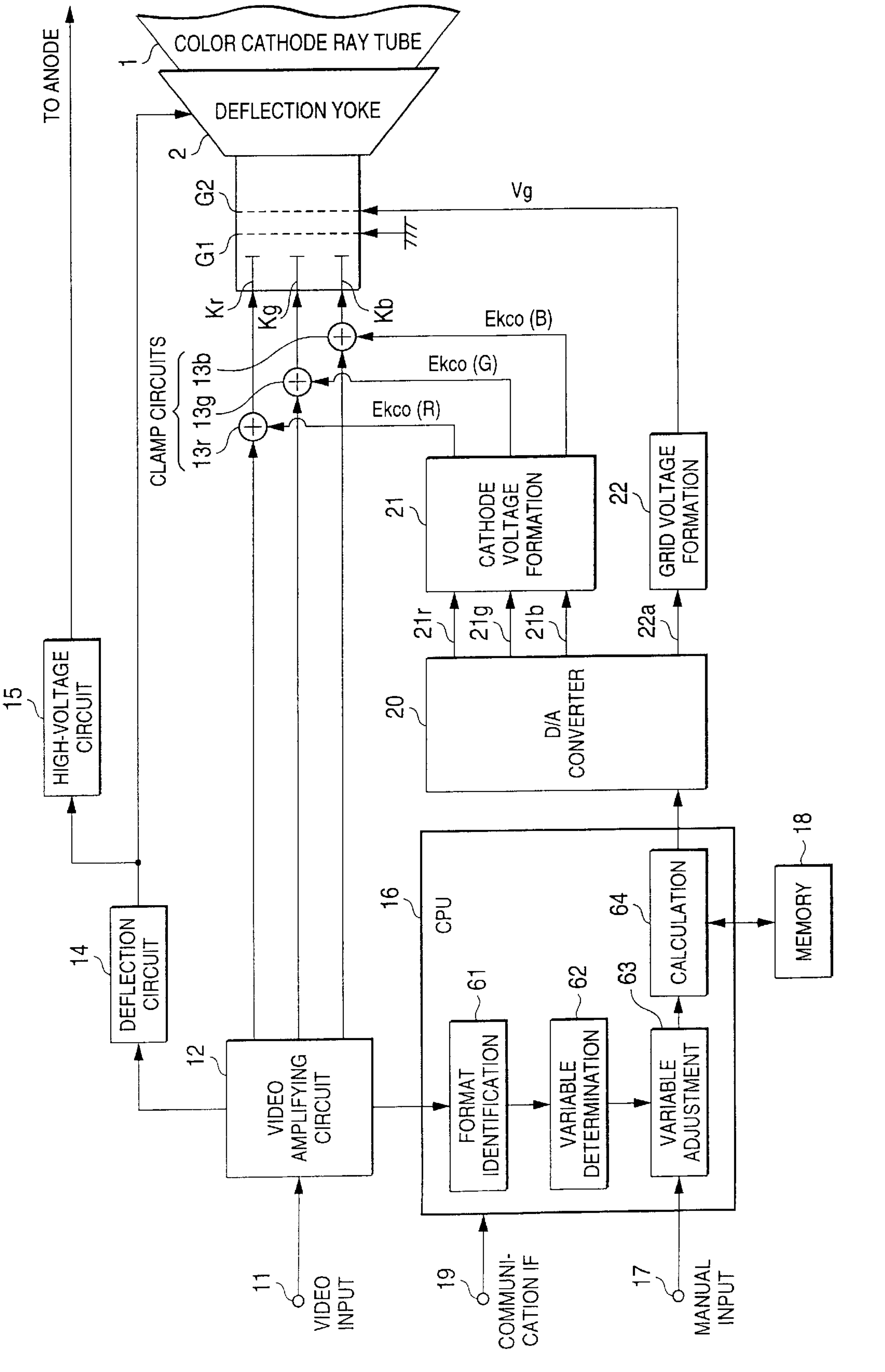
FIG. 1 is a block diagram illustrating an exemplary configuration of a color cathode ray tube according to one embodiment of the present invention, implementing an adjusting method of the present invention.

A color cathode ray tube 1 (partially shown), as illustrated in FIG. 1, comprises cathodes Kr, Kg and Kb constituting a three-gun structure for the three primary colors (RGB), and first and second grids G1 and G2, and electron beams generated at the cathodes Kr, Kg and Kb are emitted toward a display screen (not shown). In this configuration shown, the first grid G1 is illustrated as being grounded, however, the first grid G1 may instead be biased with a negative voltage.

A color video signal and a synchronization signal from, for example, a composite video signal input terminal 11 is supplied to a video amplifying circuit 12, and video signals of the three primary colors (RGB) formed in this video amplifying circuit 12 are supplied to the cathodes Kr, Kg and Kb respectively via clamp circuits 13*r,* 13*g* and 13*b*. On the other hand, the synchronization signal from the video amplifying circuit 12 is supplied to a vertical/horizontal deflection circuit 14, and vertical and horizontal deflecting currents formed therein are supplied to a deflection yoke 2 provided at the neck portion of the color cathode ray tube 1. The signal from the deflection circuit 14 is also supplied to a high voltage circuit 15, and a high voltage formed therein is supplied to an anode (not shown) of the color cathode ray tube 1.

The electron beams emitted from the cathode Kr, Kg and Kb are modulated with the video signals of the three primary colors (RGB), and at the same time, deflected by the deflection yoke 2 and accelerated by the anode (not shown), then illuminated on a phosphor on a display screen (not shown). In this way, an image represented by the composite video signal supplied to the input terminal 11 is displayed on the screen of the color cathode ray tube 1. The above video amplifier 12 herein primarily comprises video amplifiers for amplifying the video signals to a level necessary to drive the cathodes Kr, Kg and Kb, however, it may also include circuitry for any other video signal processing such as circuits to process the vertical and horizontal signals.

Furthermore, a signal from this video amplifying circuit 12 is supplied to a microcomputer (hereinafter, referred to as CPU) 16. In response to this signal, the CPU 16 identifies (61) the format of, for example, the inputted color video signal. This format is represented by, for example, [horizontal resolution]33 [vertical resolution], and since the values such as the horizontal resolution and the like cannot be detected directly from the video signal on the side of the monitor, those values are estimated from the horizontal and vertical frequencies and the polarity of the synchronization signal through calculation or use of a reference table etc. In this embodiment, the subsequent processes are performed with attention being directed especially to the horizontal resolution.

Figure 2:
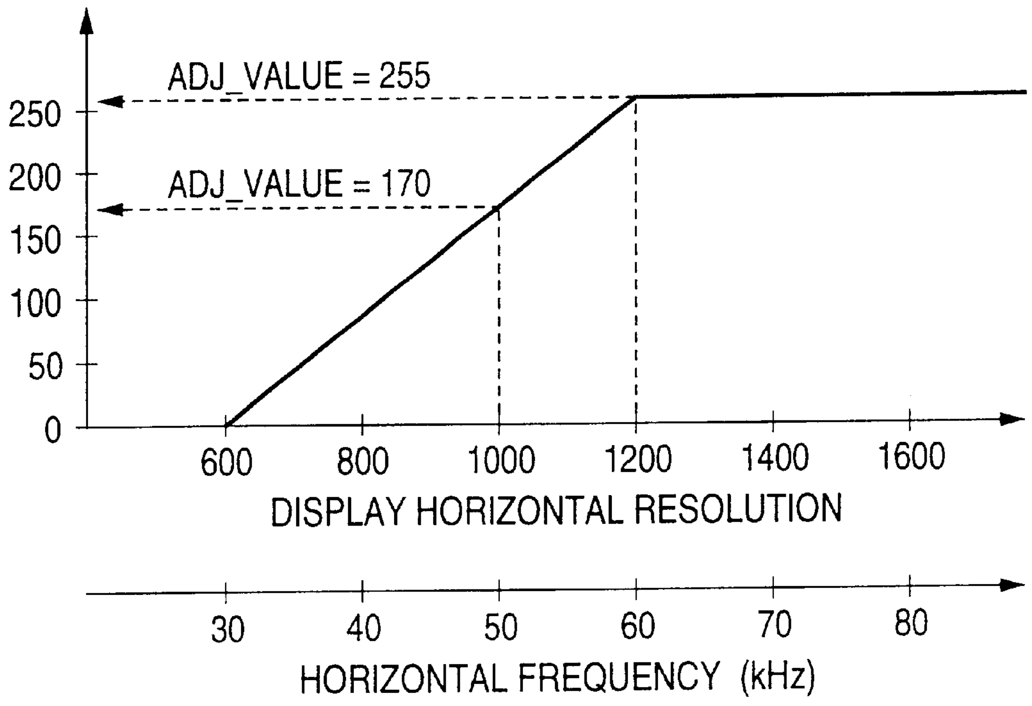
FIG. 2 is a graphical representation illustrating the relationship between the format of a color video signal and the variable [ADJ-VALUE] used in the present invention.

Based on this identified format, a given variable [ADJ_VALUE] is determined (62). That is, this variable [ADJ_VALUE] is determined relative to the horizontal resolution in a manner shown in FIG. 2. In FIG. 2, when the horizontal resolution represented by the horizontal axis is within a range below 600, for example, then the variable [ADJ_VALUE] would be the minimum value "0", and where it is in a range of 1200 and greater, the variable [ADJ_VALUE] would be the maximum value "255", and where it falls between these two ranges, the variable would linearly vary between the minimum "0" and the maximum "255". The determination of this variable [ADJ_VALUE] may instead be performed based on, for example, the horizontal frequency using 30 kHz and 60 kHz as the boundaries.

Thereafter, this determined variable is adjusted (63) within a given variable range by a control input from a user supplied through i.e. a manual input terminal 17. This adjusted variable [ADJ_VALUE ] is then used for calculation (64). In this calculation (64), calculations such as the ones listed in FIG. 3 are performed based on the above variable [ADJ_VALUE] and i.e. register values stored in a memory 18 or in storage means built in the CPU 16.

In FIG. 3, the register values shown in the leftmost column [R_ECO_MAX], [R_ECO_MIN], [G_ECO_MAX], [G_ECO_MIN], [B_ECO_MAX], [B_ECO_MIN], [G2_MAX] and [G2_MIN] represent values expressed in, for example, 8-bit digital vales, at which cutoff adjustments are performed on the cathodes Kr, Kg, Kb and the second grid G2 when the variable [ADJ_VALUE] is either the maximum "255" or the minimum "0". These register values are measured in advance during adjustment processes performed on the side of the manufacturer, and pre-stored on the memory 18 or the storage means built in the CPU 16. In these adjustment processes, any desired measurements may be made, and any necessary values may be stored by controlling the CPU 16 using, for example, a communication interface (IF) 19.

These register values and the aforementioned variable [ADJ_VALUE] are used for the calculations for implementing so-called linear interpolation, such as those shown in the center column of the table in FIG. 3. That is, in each of these calculations, an intermediate value is obtained through the linear interpolation according to the determined variable [ADJ_VALUE], using a value at which the variable [ADJ_VALUE] is the maximum "255" and a value at which the variable [ADJ_VALUE] is the minimum "0". These calculations will provide digital values corresponding to the cutoff voltages Ekco of the respective cathodes Kr, Kg and Kb and the voltage of the second grid G2, that have been linearly interpolated based on the variable [ADJ_VALUE] adequate for the format of the input signal.

These obtained digital values are then supplied to a D/A converter 20, and converted into analog signals 21*r*, 21*g*, 21*b* and 22*a* which are then supplied respectively to a cathode voltage formation circuit 21 and a grid voltage formation circuit 22. In these voltage formation circuits 21 and 22, voltages corresponding to the cutoff voltages Ekco(R), Ekco (G) and Ekco(B) and the voltage Vg for the second grid G2 are formed from the respective analog signals supplied thereto. The voltages formed in the voltage formation circuit 21 are supplied to the clamp circuits 13*r*, 13*g* and 13*b* to implement the adjustments on the cutoff voltages Ekco of the respective cathodes Kr, Kg and Kb, and at the same time, the grid voltage Vg formed within the voltage formation circuit 22 is applied to the second grid G2.

In this way, the cutoff voltages Ekco of the respective cathodes Kr, Kg and Kb and the voltage Vg of the second grid G2 may be selected based on the variable [ADJ_VALUE] determined based on i.e. the format of the input signal and then adjusted by the control input via the manual input terminal 17. In this case, as mentioned in the description with reference to FIG. 6, the cathode current Ik, therefore the luminance of the screen, may be varied even when the driving voltage Ed is kept constant, by varying the cutoff voltages Ekco of the respective cathodes Kr, Kg and Kb and the voltage Vg of the second grid G2.

In other words, in this apparatus, it is possible to vary the luminance of the screen by varying the variable [ADJ_VALUE]. Accordingly, by determining the variable [ADJ_VALUE] based on i.e. the format of an input signal as explained above, the luminance of the screen may be set to a predetermined level adequate for the format of the input signal. At the same time, by adjusting this variable [ADJ_VALUE] by a control input from, for example, the manual input terminal 17, the luminance of the screen may be arbitrarily controlled according to an instruction from a user. In this way, the luminance of the screen may be set to a desired level.

The luminance life of a cathode ray tube depends largely on the current density drawn from the cathodes, and the cathode current density depends upon the driving voltage Ed and the cutoff voltage Ekco. According to the formula (1) previously mentioned, a larger driving voltage Ed would cause an increased cathode current Ik which corresponds to the luminance. In this case, the amount of the current drawn out from the cathode would change while an area of the cathode effective for drawing out the current would not change substantially, so that this would result in an increased current density, which in turn, degrades the luminance life of the cathode ray tube.

On the other hand, where the cutoff voltages Ekco of the cathodes and the voltage Vg of the second grid G2 are varied as explained above, the values varied would be the working efficiency value K which becomes smaller inversely as a cutoff voltage Ekco in the formula (1) increases, and an exponent $\gamma$ which reduces as the second grid voltage Vg increases. Accordingly, in this case, as the cathode current Ik increases, the area of the cathode for drawing out the current would proportionally expand, so that the increase in the cathode current Ik would not have much adverse impact on the luminance life of the cathode ray tube. Instead, the size of a beam spot would be increased by the increased amount of the area for drawing out the electron beam.

That is, the relationship among these values may be expressed in the following formula (2).

$$Jk \cong Ik/((Ed/Ekco).S) \qquad (2)$$

Here, the value Jk represents a cathode current density, and the value S represents an area of a hole in the first grid. In this way, although the reproducibility of fine data may be degraded due to the increased beam spot, the maximum luminance may substantially be improved without sacrificing the luminance life of the cathode ray tube by changing the characteristic of the cathode current Ik relative to the driving voltage Ed by varying the cathode voltages Ek and the first and second grid voltages.

FIG. 4 illustrates the relationship between the voltage of the respective electrodes and the all-white luminance and the spot size. For instance, with the driving voltages of 36Vp-p, 36Vp-p and 37Vp-p being set for the cathodes Kr, Kg and Kb respectively, the all-white luminance may be varied from 123 nits to 225 nits by varying the second grid voltage Vg from 557V to 257V, and the cutoff voltage Ekco(R) of the cathode Kr from 94V to 47V, the cutoff voltage Ekco(G) of the cathode Kg from 100V to 50V, and the cutoff voltage Ekco(B) of the cathode Kb from 98V to 49V. Also, this would cause to change the spot size from $\phi$0.55 to $\phi$0.78, so that the spot size expands as the luminance level increases.

Therefore, according to the present embodiment, by configuring the color cathode ray tube comprising at least the cathodes for the three primary colors and the first and second grids, in a manner in which the cutoff volt ages of the respective cathodes for the three primary colors and the voltage of the second grid may be calculated using a common variable, and these voltages may be arbitrarily set, the luminance level may be desirably controlled, and at the same time, these voltages that are associated to each other may readily be configured.

In a case of a conventional computer monitor which is designed to provide a low level of luminance for example, it has been said that its screen is too dark to be able to provide powerful and realistic representation of dynamic picture images, and the luminance level enhancement through i.e. an increased input signal level would degrade the luminance life of the cathode ray tube, thus, such a monitor has been so designed that its luminance would never exceed a given level through implementation of a protection mechanism, however, in a case of the present invention, these problems are readily solved.

In the above apparatus, an input to the manual input terminal 17 may be a signal of a voltage formed in a variable resistor which has been A/D-converted, or a signal supplied via inputting means, which may be any arbitrary switch (not shown). This manual input terminal 17 may further be configured to provide means for a user to adjust various other parameters of the monitor controlled by the CPU 16, besides this variable [ADJ_VALUE].

In the above apparatus, where the variable [ADJ_VALUE] is designed to be obtained based on an identified format of the input signal for example, predetermined optimal values of the variable [ADJ_VALUE] for respective formats may be provided in a memory etc. in advance to allow the variable [ADJ_VALUE] to be derived from an identified format. Where the variable [ADJ_VALUE] is designed to be determined from the horizontal resolution as previously explained, the cutoff condition may be so configured that higher luminance would be provided for low resolution signals such as a signal of 640×480 while the focusing characteristic rather than the luminance would be prioritized for those high resolution signals such as a signal of 1600×1200.

Furthermore, the D/A converter 20 may be provided as a part of the CPU 16, or built in the voltage formation circuits 21 and 22. Alternatively, a configuration implementing no D/A conversion may also be contemplated, and in this case, the outputs of the respective voltage formation circuits 21 and 22 are varied using electron volume. Moreover, the determination process of the input signal format is not limited to the above-described method in which the determination is made within the CPU 16, the process may alternatively be implemented by a dedicated, discrete circuit etc. The configuration of the register values stored within the memory 18 is not limited to the above-described configuration, and the operational expressions are not limited to the ones for the above-described linear interpolation, and any arbitrary alternative approach may be used.

As explained heretofore, the color cathode ray tube disclosed herein is one that includes at least the cathodes for the three primary colors and the first and second grids, and comprises calculating means for calculating cutoff voltages of the respective cathodes for the three primary colors and a voltage of the second grid using a common variable, controlling means to vary the variable, and setting means for arbitrarily setting the cutoff voltages of the respective cathodes for the three primary colors and the voltage of the second grid, thereby providing desirable control over the luminance level by allowing the arbitrary setting of the cutoff voltages of the respective cathodes for the three primary colors and the voltage of the second grid, as well as simple configuration of these voltages that are mutually associated.

Furthermore, the adjusting method of a color cathode ray tube disclosed herein is the method for adjusting a cathode ray tube comprising at least cathodes for the three primary colors and first and second grids, comprising the steps of calculating cutoff voltages for the respective cathodes for the three primary colors and a voltage for the second grid using a common variable, and setting the cutoff voltages of the respective cathodes for the three primary colors and the voltage of the second grid based on the values calculated as the variable is varied, thereby providing desirable control over the luminance level by allowing the arbitrary setting of the cutoff voltages of the respective cathodes for the three primary colors and the voltage of the second grid, as well as simple configuration of these voltages that are mutually associated.

It should be appreciated that the present invention is not limited to the embodiments disclosed herein, and various modifications may be contemplated without departing from the sprit of the present invention.

Effect

According to the first aspect of the present invention, a color cathode ray tube comprising at least cathodes for the three primary colors and first and second grids is configured in a manner so that cutoff voltages of the respective cathodes for the three primary colors and a voltage of the second grid may be calculated by using a common variable, and they may be arbitrarily set, so that luminance level may be desirably controlled by arbitrarily setting the cutoff voltages of the respective cathodes for the three primary colors and the voltage of the second grid, and configuration of these voltages that are associated to each other may be readily performed.

According to the second aspect of the present invention, determining means is provided for determining the variable based on an identified format, so that the cutoff voltages of the respective cathodes for the three primary colors and the voltage of the second grid adequate for the format of the input signal may be set in an extremely simple manner.

According to the third aspect of the present invention, adjusting means is provided for performing an adjustment on the determined variable within an arbitrary variable range, thereby allowing a user to arbitrarily control the luminance level.

According to the fourth aspect of the present invention, a color cathode ray tube comprising at least cathodes for the three primary colors and first and second grids is configured in a manner so that cutoff voltages of the respective cathodes for the three primary colors and a voltage of the second grid may be calculated by using a common variable, and they may be arbitrarily set, so that luminance level may be desirably controlled by arbitrarily setting the cutoff voltages of the respective cathodes for the three primary colors and the voltage of the second grid, and configuration of these voltages that are associated to each other may be readily performed.

According to the fifth aspect of the present invention, by determining the variable based on an identified format, the cutoff voltages of the respective cathodes for the three primary colors and the voltage of the second grid adequate for the format of the input signal may be set in an extremely simple manner.

According to the sixth aspect of the present invention, by performing an adjustment on the determined variable within an arbitrary variable range, a user may arbitrarily control the luminance level.

Accordingly, the present invention provides simple solutions to the problems pointed out for a conventional computer monitor, such as the one designed to provide a low level of luminance, in which the screen is too dark for providing powerful and realistic representation of dynamic picture images, and it has to implement a protection mechanism to limit the luminance control only up to a given level because when the luminance enhancement is attempted through an increased input signal level for example, the luminance life of the cathode ray tube would be degraded.

What is claimed is:

1. A display apparatus including a color cathode ray tube having at least cathodes for the three primary colors, and first and second grids, comprising;

calculating means for calculating cutoff voltages of the respective cathodes for the three primary colors and a voltage of said second grid using a common variable; and setting means for setting the respective cutoff voltages for said cathodes for the three primary colors and the voltage of said second grid based on values obtained from said calculation;

whereby said common variable is initially set according to one or more of the horizontal resolution of a video signal and the horizontal frequency of a video signal.

2. The display apparatus as claimed in claim 1 wherein said setting means is a D/A converter which converts a digital output supplied from said calculating means into a corresponding voltage.

3. The display apparatus as claimed in claim 1 further comprising;

identifying means for identifying the format of an input signal; and determining means for determining said variable based on said identified format.

4. The display apparatus as claimed in claim 3 wherein said determining means determines said variable by using the horizontal resolution.

5. The display apparatus as claimed in claim 3 wherein said determination means determines said variable by using the frequency of a horizontal synchronization signal.

6. The display apparatus as claimed in claim 3 further comprising adjusting means for allowing manual adjustment on said determined variable within any arbitrary variable range.

7. An adjusting method of a display apparatus including a color cathode ray tube having at least cathodes for the three primary colors, and first and second grids, comprising the steps of;

calculating cutoff voltages of said respective cathodes for the three primary colors and a voltage of said second grid using a common variable; and setting said cutoff voltages of said respective cathodes for the three primary colors and said voltage of said second grid based on values obtained from said calculation;

whereby said common variable is initially set according to one or more of the horizontal resolution of a video signal and the horizontal frequency of a video signal.

8. The adjusting method of a display apparatus as claimed in claim 7 further comprising the steps of;

identifying the format of an input signal; and determining said variable based on said identified format.

9. The adjusting method of a display apparatus as claimed in claim 7 wherein said variable is determined by using the horizontal resolution of said identified format.

10. The adjusting method of a display apparatus as claimed in claim 7 wherein said variable is determined by using the frequency of a horizontal synchronization signal of said identified format.

11. The adjusting method of a display apparatus as claimed in claim 7 further comprising the step of performing manual adjustment on said determined variable within any arbitrary variable range.

* * * * *